United States Patent [19]

Hofinger et al.

[11] Patent Number: 4,686,066
[45] Date of Patent: Aug. 11, 1987

[54] METHOD FOR THE SEPARATION OF OIL-IN-WATER EMULSIONS

[76] Inventors: Manfred Hofinger; Martin Hille; Roland Böhm, all of Hoechst Aktiengesellschaft, P.O. Box 80 03 20, D-6230 Frankfurt am Main 80, Fed. Rep. of Germany

[21] Appl. No.: 810,661

[22] Filed: Dec. 18, 1985

[30] Foreign Application Priority Data

Dec. 20, 1984 [DE] Fed. Rep. of Germany ....... 3446489

[51] Int. Cl.$^4$ .............................................. B01D 17/04
[52] U.S. Cl. ..................................... 252/344; 526/295
[58] Field of Search ........................ 252/344; 526/295

[56] References Cited

U.S. PATENT DOCUMENTS

| 3,316,181 | 4/1967 | Sackis | 526/310 |
| 3,585,148 | 6/1971 | Sackis | 252/344 |
| 4,026,794 | 5/1977 | Mauceri | 252/344 |
| 4,120,815 | 10/1978 | Raman | 526/295 |
| 4,151,202 | 4/1979 | Hunter et al. | 526/295 |
| 4,160,742 | 7/1979 | Raman | 252/344 |
| 4,374,734 | 2/1983 | Newcombe | 252/344 |
| 4,405,015 | 9/1983 | McCoy et al. | 252/344 |
| 4,457,371 | 7/1984 | McCoy et al. | 252/344 |

FOREIGN PATENT DOCUMENTS 103698  3/1984  European Pat. Off. ............ 526/295

Primary Examiner—Joseph L. Schofer
Assistant Examiner—J. M. Reddick
Attorney, Agent, or Firm—Connolly and Hutz

[57] ABSTRACT

The separation of oil-in-water emulsions can be considerably improved if an effective amount of a homopolymer of diallyldimethylammonium chloride, which contains in addition 5 to 10% by weight of residual monomer, is added as a demulsifying substance.

3 Claims, No Drawings

METHOD FOR THE SEPARATION OF OIL-IN-WATER EMULSIONS

The invention relates to a method for the separation of oil-in-water emulsions by addition of cationic polymers.

The problem of separating oil-in-water emulsions is encountered in particular in the extraction and working up of crude oil and also in the further processing of the latter at the refinery.

In deposit fields crude oils form with the water present, depending on the chemical composition, more or less light water-in-oil emulsions. For separating these a large number of methods and effective substances for the purpose are known to the specialist. In this separation process a separated aqueous phase is formed which, depending on the type of crude oil, may still contain substantial quantities of oil. These have to be recovered in a special process, the breaking of so-called reversed emulsions, for which special demulsifiers (so-called reverse demulsifiers) are necessary which are different from those which are used for the separation of water-in-soil emulsions. For the separation of oil-in-water emulsions polymers are used, ionic polymers giving better separation and here again cationic polymers being more effective than anionic ones.

As cationic polymers for this purpose copolymers of acrylamide and diallylamine have been described in the U.S. Pat. No. 3,316,181 and copolymers of acrylamide and diallyl dialkylammonium chloride in the U.S. Pat. No. 3,585,148. According to the U.S. Pat. No. 4,120,815 a mixture of a cationic terpolymer of acrylamide/diallyldimethylammonium chloride/diallyldiethylammonium chloride and an amphoteric quaterpolymer of acrylamide/acrylic acid/diallyldimethylammonium chloride/diallyldiethylammonium chloride in a weight ratio of 50:50 brings about an improvement. It is, however, obvious that the preparation of such a mixture is very complicated. In the said U.S. Pat. No. 4,120,815 there are also mentioned for comparison non hydrolyzed homopolymers of dimethyldiallylammonium chloride for this purpose which, however, do not give adequate results in the separation (cf. comparative experiments D in the Examples I to V) and are therefore regarded as unsuitable for the separation of such emulsions.

The improvement of such separation processes, in particular in relation to the extraction of petroleum is, however, an on-going task since rising raw material prices call for increasingly intensive extraction and isolation of residual quantities of crude oil.

Surprisingly, it has now been found that a considerable improvement can be achieved if in a process of the type mentioned in the introduction a homopolymer of diallyldimethylammonium chloride which contains in addition 5 to 10% by weight of monomer and has a viscosity of 15,000 to 45,000 mPa s measured in a 38% by weight solution in water at 25° C. is added to the emulsion.

The method according to the invention is based on the surprising observation that homopolymers of diallyldimethylammonium chloride (DADMAC) are specially suitable for the demulsifying of oil-in-water emulsions if they are obtained by a homopolymerization of DADMAC in which the degree of reaction is at least 90% and at most 95%, i.e. 5 to 10% by weight of residual monomer referred to the total weight of monomer plus polymer is still present and if the viscosity of the homopolymer obtained, measured in a 38% by weight solution in water at 25° C., is 15,000 to 45,000, preferably 20,000 to 30,000 mPa s. Preferably the poly-DADMAC used according to the invention is prepared by a homopolymerization which has been conducted to a degree of conversion of at least 91% to at most 93%, i.e. 7 to 9% by weight of residual monomer referred to the total weight of monomer plus polymer are still present.

DADMAC is a compound which has been known for a long time and is usually prepared from dimethylamine and allyl chloride (cf., for example, U.S. Pat. No. 2,923,701 and U.S. Pat. No. 3,461,163). The homopolymerization of DADMAC in the aqueous phase is also known, for example from the U.S. Pat. No. 3,288,770. Polymerization of this type is also used here, water soluble radical-forming initiators such as ammonium or alkali peroxodisulfate or 2,2'-azo-bis-(2-amidinopropane)-dihydrochloride are present. In order to exclude heavymetal traces, which prevent the polymerization, complexing agents such as the sodium salt of ethylene diamine tetraacetic acid are added. If peroxodisulfates are used, buffer substances such as potassium hydrogencarbonate may be added. In order to obtain the poly-DADMAC used in the method according to the invention with the abovementioned residual monomer content and the viscosity defined above, an initial concentration of the monomer of 60 to 65% by weight in water is maintained, a polymerization temperature of 80° to 85° C. is established and the initiator used in a quantity of $5 \cdot 10^{-3}$ to $1 \cdot 10^{-2}$ mol per 1 mol of monomer. The reaction is continuously followed by measurement using HPCL (=High Performance Liquid Chromatography). It is stopped in the region of 90 to 95, preferably 91 to 93% reaction by cooling down or by addition of inhibitors such as hydroquinone, benzoquinone and the like or brought back to this degree of reaction by a suitable post reaction period.

Poly-DADMAC obtained in this manner is a viscous clear fluid which has a pH of 6 to 7. It can used as such without dilution in the method according to the invention since it is infinitely miscible with water in all proportions. The concentration in which it is used may vary depending on the nature of the oil-in-water emulsions to be separated and the temperatures encountered. Frequently this concentration is in the range from 1 to 50,00, preferably 3 to 500 ppm of active substance referred to the emulsion to be broken.

For reasons of improved dispensibility, however, a more diluted aqueous standard may be preferred.

The method according to the invention is particularly applicable to the process of so-called reversed demulsification in the primary extraction of petroleum in which an oil-in-water emulsion accumulates which is obtained as the aqueous phase in the preceding separation of the water-in-oil emulsions obtained during extraction. In addition oil-in-water emulsions are yielded in large quantities in the secondary and tertiary extraction of petroleum with increasing exhaustion of the crude oil deposits. Finally water washing of crude oils is frequently carried out in addition also in refineries and the oil-in-water emulsions produced in this process must also be worked up.

The invention is explained by means of the following examples:

PREPARATION OF THE POLY-DADMAC SAMPLES USED ACCORDING TO THE INVENTION

Example 1

555 g of a 60% solution of diallyldimethylammonium chloride in water are mixed with an aqueous solution of 2.3 g of potassium hydrogen carbonate and 130 mg of the sodium salt of ethylene diamine tetraacetic acid. After intensive degassification and flushing with nitrogen, 2.4 g of ammonium peroxodisulfate dissolved in 34 g of water are continuously added at a temperature of 82° C. over a period of 100 min. After a post reaction time of 2 h at 80° C. the polymerization is terminated. According to HPLC the product has a residual monomer content of 5% by weight and furthermore a viscosity of 32,000 mPa s at 25° C. A content of 38% by weight is established for the viscosity measurement using water.

Example 2

The procedure is as specified in Example 1, but now 2.4 g of ammonium peroxodisulfate, dissolved in 90 g of water, are added over a period of 100 min. The post reaction time is 1.5 h.

Example 3

The procedure is as specified in Example 2, but with a post reaction time of 2 h.

COMPARATIVE EXAMPLES 1a TO 3a

The poly-DADMAC comparative samples are obtained by the specification in Example 1, but a greater quantity of initiator ($1 \cdot 10^{-2}$ to $5 \cdot 10^{-2}$ mol referred to 1 mol of monomer) is used and the process time is optionally prolonged until the degree of reaction is 100%.

The DADMAC homopolymers used in the separation processes specified below have the following characteristics:

| Example/ Comparative Example | Polymerization reaction (%) | Residual monomer content | Viscosity (mPa s)* |
|---|---|---|---|
| 1 | 95.0 | 5.0 | 32,000 |
| 2 | 90.0 | 10.0 | 16,000 |
| 3 | 91.8 | 8.2 | 24,500 |
| 1a | virtually 100 | virtually 0 | 32,000 |
| 2a | virtually 100 | virtually 0 | 46,000 |
| 3a | virtually 100 | virtually 0 | 44,000 |

*measured on a 38% by weight solution at 25° C. using a rheomat 30 manufactured by Contraves, AG, Zurich (Switzerland).

The following tables show the superior action of the DADMAC homopolymers used in the process according to the invention.

| Separation of oil-in-water emulsions from an oil field | | | | |
|---|---|---|---|---|
| Origin: North Germany | Oil content: 1,250 ppm Concentration ppm | | | |
| Product according to example | 0 | 20 | 30 | 40 |
| | Concentration of oil in the water ppm | | | |
| 1 | 1250 | 220 | 80 | 33 | 18 |
| 2 | 1250 | 180 | 55 | 21 | 12 |
| 3 | 1250 | 200 | 40 | 20 | 12 |
| 1a | 1250 | 1100 | 600 | 550 | 500 |
| 2a | 1250 | 1200 | 900 | 750 | 980 |
| 3a | 1250 | 1200 | 1100 | 630 | 280 |

Here and in the following examples the oil determination was carried out with the oil-in-water measuring instrument manufactured by Horiba, Kyoto (Japan).

The reversed demulsifiers were dispensed as a 30% by weight solution and the samples for the oil determination taken after 3 h of creaming time.

| Separation of oil field effluent | | | | | |
|---|---|---|---|---|---|
| Origin: Borneo | Concentration in ppm | | | | |
| Product according to example | 0 | 2 | 4 | 10 | 20 |
| | Concentration of oil in the water in ppm | | | | |
| 1 | 355 | 160 | 48 | 15 | 11 |
| 2 | 355 | 124 | 36 | 14 | 10 |
| 3 | 355 | 140 | 40 | 14 | 11 |
| 1a | 355 | 320 | 168 | 82 | 65 |
| 2a | 355 | 335 | 211 | 128 | 95 |
| 3a | 355 | 330 | 195 | 111 | 88 |

The reversed demulsifiers were dispensed as a 30% by weight solution and the samples for the oil determination were taken after one hour.

| Separation of refinery effluent | | | | |
|---|---|---|---|---|
| Origin: West Germany | Oil content 115 ppm Concentration ppm | | | |
| Product according to example | 0 | 1 | 2 | 3 |
| | Concentration of oil in the water in ppm | | | |
| 1 | 115 | 28 | 12 | 5 |
| 2 | 115 | 33 | 14 | 6 |
| 3 | 115 | 26 | 10 | 4 |
| 1a | 115 | 105 | 86 | 73 |
| 2a | 115 | 110 | 103 | 95 |
| 3a | 115 | 100 | 82 | 70 |

The reversed demulsifiers were dispensed as a 30% by weight solution and the samples for the oil determination were taken after 30 min.

| Oil field effluent of a steam-flooded deposit | | | | |
|---|---|---|---|---|
| Origin: Venezuela | Concentration ppm | | | |
| Product according to example | 0 | 100 | 200 | 300 |
| | Concentration of oil in the water in ppm | | | |
| 1 | 12,000 | 428 | 66 | 35 |
| 2 | 12,000 | 396 | 73 | 38 |
| 3 | 12,000 | 445 | 54 | 28 |
| 1a | 12,000 | 5,850 | 3,240 | 490 |
| 2a | 12,000 | 6,130 | 3,627 | 560 |
| 3a | 12,000 | 7,280 | 3,885 | 490 |

The reversed demulsifiers were dispensed in a 10% dilution with water and the samples for the oil determination were taken after 4 hours.

I claim:

1. Method for the separation of oil-in-water emulsions by addition of cationic polymers, wherein an effective amount of a hompolymer of diallyldimethylammonium chloride, which contains in addition 5 to 10% by weight of diallyldimethylammonium chloride monomer and has a viscosity of 15,000 to 45,000 mPa s measured in a 38% by weight solution in water at 25° C., is added to the emulsion.

2. A method as claimed in claim 1, wherein an effective amount of a homopolymer of diallyldimethylammonium chloride which contains in addition 7 to 9% by weight of diallyldimethylammonium chloride monomer is added to the emulsion.

3. A method as claimed in claim 1, wherein an effective amount of a homopolymer of diallyldimethylammonium chloride which has a viscosity of 20,000 to 30,000 mPa s measured in a 38% by weight solution in water at 25° C. is added to the emulsion.

* * * * *